United States Patent [19]

Quin

[11] 4,277,339
[45] Jul. 7, 1981

[54] PAINT PIGMENT SKIMMER

[76] Inventor: Michael J. Quin, 12667 Farley, Detroit, Mich. 48239

[21] Appl. No.: 97,484

[22] Filed: Nov. 26, 1979

[51] Int. Cl.³ .................... B01D 29/04; B01D 29/38
[52] U.S. Cl. .................................. 210/413; 55/296; 209/389; 210/159; 210/167
[58] Field of Search .................... 55/228, 430, 296; 210/159, 162, 167, 413, 414, 158, 334, 355, 396, 397; 209/385, 389, 390

[56] References Cited

U.S. PATENT DOCUMENTS

| 392,719 | 11/1888 | Cloudman | 210/413 X |
|---|---|---|---|
| 955,843 | 4/1910 | Bossert | 210/355 |
| 1,038,167 | 9/1912 | Maitland | 55/296 |
| 1,993,231 | 3/1935 | Tunstall | 55/296 |
| 2,149,751 | 3/1939 | Tolman | 210/159 X |
| 2,594,456 | 4/1952 | Kroenlein | 55/296 |
| 2,805,844 | 9/1957 | McMaster | 210/167 X |
| 2,865,509 | 12/1958 | Harlan | 210/414 X |
| 2,919,806 | 1/1960 | Hock et al. | 210/414 |
| 3,319,789 | 5/1967 | Brown et al. | 210/67 |
| 3,332,556 | 7/1967 | Hirs | 210/413 X |
| 3,391,786 | 7/1968 | Beattie | 210/67 |
| 3,516,230 | 6/1970 | Saubesty | 55/228 |
| 3,722,684 | 3/1973 | Maestrelli | 210/167 |
| 4,088,577 | 5/1978 | Muller | 210/67 |
| 4,091,545 | 5/1978 | Izawa et al. | 210/67 X |

FOREIGN PATENT DOCUMENTS

| 377273 | 9/1907 | France | 210/413 |
|---|---|---|---|
| 2249701 | 5/1975 | France | 210/414 |
| 19718 | of 1911 | United Kingdom | 210/413 |

Primary Examiner—Robert H. Spitzer
Attorney, Agent, or Firm—Basile, Weintraub & Hanlon

[57] ABSTRACT

An apparatus for separating pigment containing cake from a vehicle such as water is disclosed. The apparatus comprises a skimmer which includes a reservoir for containing the cake containing vehicle and a continuous conveyor belt inclined upward from a surface of the cake containing vehicle. In a preferred embodiment a plurality of upward extending walls are attached to the conveyor belt for skimming the cake from the vehicle. An inclined wall is disposed parallel to a space below the belt to slidingly engage the outward extending walls as they move therepast. A lower portion of the inclined wall is positioned over the reservoir, and an upper portion of the inclined wall extends outward from the reservoir, with the lower portion of the inclined wall perforated to allow vehicle to drain from the cake into the reservoir thus separating the cake and the vehicle. A discharge opening formed at an upper end of the inclined wall allows the separated cake to be discharged into a receptacle for collection.

7 Claims, 3 Drawing Figures

PAINT PIGMENT SKIMMER

BACKGROUND OF THE INVENTION

I. Field of the Invention

The present invention generally relates to filtering devices and, in particular, the present invention is concerned with filter devices for separating cake from a vehicle. Even more particularly the present invention is concerned with an apparatus for separating paint pigment containing cake from a vehicle such as water in an ecocomical manner.

II. Description of the Prior Art

In recent years there has been a growing concern by the public and manufacturers for the health of industrial workers, and in particular there has been a need for cleaner air in the work environment. Paint spraying of industrial articles of manufacture such as automobiles introduces a large number of particulates into the surrounding air which must be filtered to remove the hazardous chemicals that become air-borne in the spraying operation. Paint spray-booths are generally employed wherein fresh air is circulated past the article being sprayed and the workers applying the paint, with the air then circulated through a water wash operation. In the water wash the pigment is collected by water sprayed past the contaminated air. The water serves as a vehicle for holding the pigment and the pigment containing water is conveyed to a filter apparatus which employs a filter media to separate the pigment from the water or vehicle. The filter media frequently becomes clogged and requires frequent replacement.

III. Prior Art Statement

U.S. Pat. Nos.: 2,149,751; 3,391,786; and 4,091,545 disclose apparatus for removing cake from water utilizing a conveyor belt. Each of the above listed United States Patents employ vertical walls attached to a conveyor belt for scooping cake from the bottom of a vat or reservoir where the cake is first allowed to settle from the vehicle. U.S. Pat. Nos. 3,391,786; and 4,091,545 employ the further addition of heat to dry the cake as it is conveyed. U.S. Pat. No. 3,319,789 employs the steps of preliminary media filteration, steam application, and air drying to separate the cake from the water. U.S. Pat. No. 4,088,577 employs an apparatus having a co-axial mixing shaft with paddles affixed thereto contained within a cylinderical drum deployed along a horizontal access. The pigment cake and vehicle are added to the drum and the shaft is driven or rotated at a rate to form a pigment vehicle paste around the shaft leaving the water in the lower part of the drum. These patents are relevant to the Applicant's invention in that they represent the closest prior art for separating cake or pigment from a vehicle.

The aforementioned Prior Art in the opinion of the Applicant and the Applicant's Attorney, represents the closest prior art of which the Applicant and his Attorney are aware.

SUMMARY OF THE INVENTION

The present invention which will be described in greater detail hereinafter, comprises an apparatus for separating pigment containing cake from a vehicle which includes a reservoir for containing the cake containing vehicle, a continuous conveyor belt inclined upward from a surface of the cake containing vehicle, and a plurality of outward extending walls attached to the belt for movement therewith. The outward extending walls engage the cake containing vehicle at the vehicle surface at a lower end of the belt. An inclined wall is positioned parallel to and spaced below the belt to slidingly engage the outward extending walls, and the cake is moved along the inclined wall by the outward extending walls. A discharge opening is provided at an upper end of the inclined wall where the cake is discharged into a container wherein the cake is collected for subsequent recycling or disposal.

It is therefore a primary object of the present invention to provide a new and improved device for separating pigment containing cake from a vehicle.

It is a further object of the present invention to provide such a device for separating pigment containing cake from a vehicle which employs a plurality of vertical walls attached to a continuous belt to lift cake from the vehicle.

It is yet another object of the present invention to provide an improved device for separating pigment containing cake from a vehicle which employs a plurality of vertical walls attached to a continuous belt to lift cake from a vehicle and moves the cake along an inclined wall where the vehicle is drained from the cake.

It is a further object of the present invention to provide a device for separating pigment containing cake from a vehicle which employs a plurality of vertical walls attached to a continuous belt, the cake moved along an inclined wall having a plurality of apertures formed therein to drain vehicle from the cake.

Further objects, advantages, and applications of the present invention will become apparent to those skilled in the art to which this invention pertains, when the accompanying description of one example of the best mode contemplated for practicing the invention is read in conjunction with the accompanying drawing.

BRIEF DESCRIPTION OF THE DRAWING

In the drawing, like reference numbers refer to like parts throughout the several views, and wherein.

DESCRIPTION OF THE PREFERRED EMBODIMENT

Figure 1:
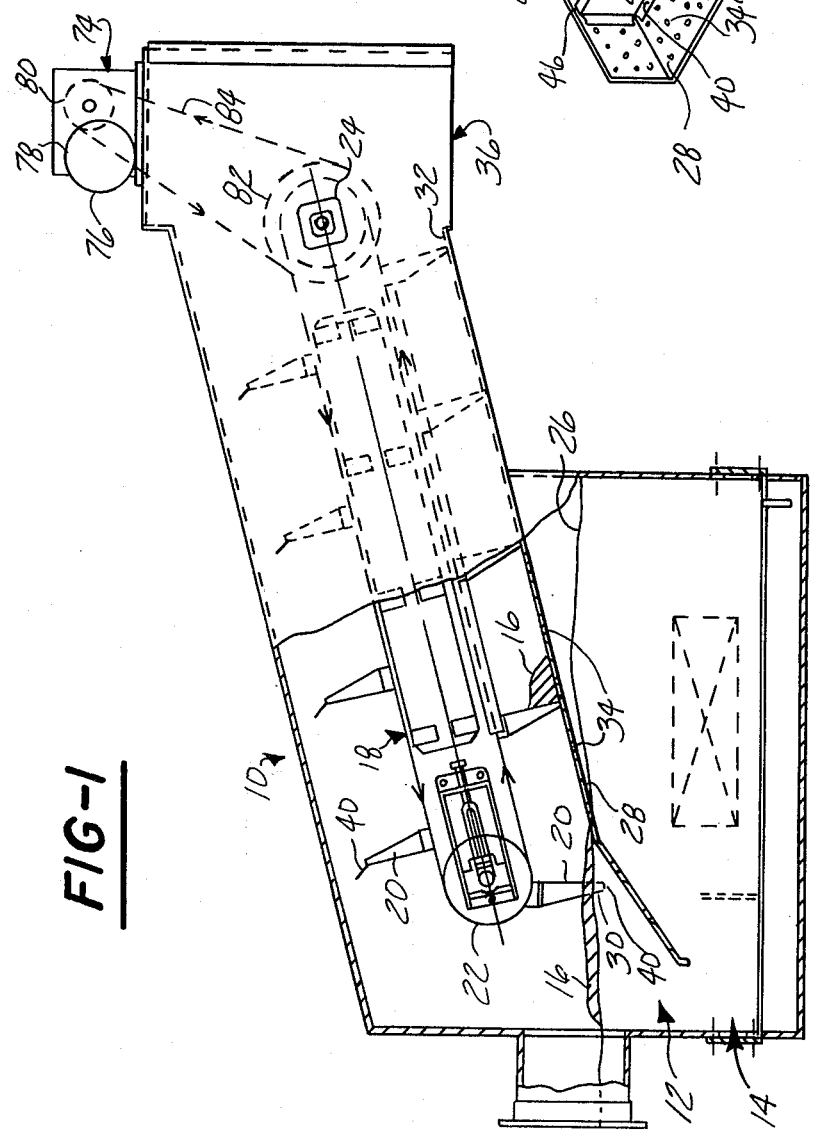
FIG. 1 illustrates a partial cross-sectional view of a preferred embodiment of the paint skimmer of the present invention.

Referring now to the drawing and in particular to FIG. 1 wherein there is illustrated one example of the present invention in the form of a paint skimming apparatus 10. The paint skimming apparatus 10 is adapted to receive cake containing vehicle 12 in a reservoir 14 where a cake 16 is allowed to float to the top of the vehicle where it is skimmed from the surface in a manner which will be described subsequently.

A continuous conveyor belt 18 having a plurality of outward extending walls 20 affixed thereto in a spaced apart manner is supported between a pair of drums 22,24. The drums 22,24 support the conveyor belt 18 in an upwardly inclined manner extending upward from a vehicle surface 26 with the lower drum positioned slightly above the vehicle surface 26 and the upper drum 24 positioned upward and outward therefrom. An inclined wall 28 is deployed parallel to and spaced below the belt 18 to slidingly engage an outer end 30 of the outward extending walls 20. As the continuous conveyor belt 18 is rotated, the outward extending walls 20 dip below the surface 26 and engage the floating cake 16 pushing the cake 16 upwardly along the inclined wall 28 toward an upper end 32 thereof. A plurality of apertures 34 formed through the inclined wall 28 above the reservoir 14 allow the vehicle 12 contained in the cake 16 to be drained back to the reservoir and to be drained downward along the inclined wall back to the reservoir 14.

Figure 2:
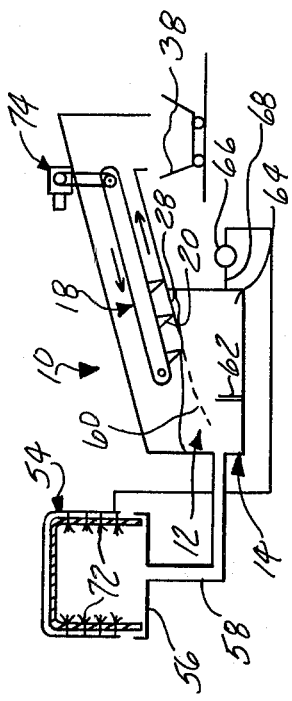
FIG. 2 illustrates in diagrammatic form the paint skimmer of the present invention used in conjunction with a water spray chamber for separating air-borne pigment to purify the air.

The cake 16 is moved upward along the inclined wall 28 until the upper end 32 is reached where an opening 36 is formed to allow the cake to drop under gravity into a container 38, as shown in FIG. 2, where the cake is collected for recycling or disposal. In a preferred embodiment, a resilient wall 40 is affixed an outer end 30 of the outward extending walls to form a seal between the outward extending walls 20 and the inclined wall 28 wiping the inclined wall 28 clean of cake as the outward extending walls 20 pass therealong. The resilient wall 40 also has the desirable effect of projecting into the apertures 34 as it passes thereover to clean cake from the apertures and prevent them from becoming clogged.

Figure 3:
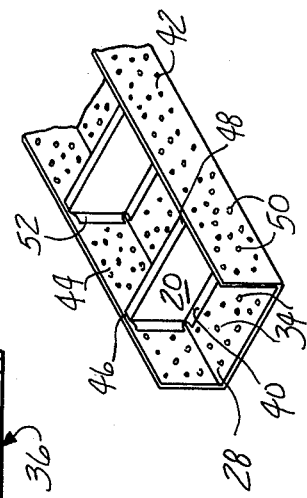
FIG. 3 illustrates a broken perspective view of the inclined wall of the present invention.

Referring now to FIG. 3, a pair of opposed vertical walls 42,44 are affixed to the edges of the inclined wall 28 extending upward therefrom to slidingly engage opposed ends 46,48 of the outward extending walls 20. An optional plurality of apertures 50 may be formed in the opposed vertical walls 42,44 to further aid in draining of the vehicle from the cake as it is passed therealong. Vertical resilient walls 52 may optionally be attached to the opposed ends 46,48 to slidingly engage the vertical walls 42,44 and provide a wiping action to aid in moving the cake along the walls and clean the apertures 50 as the vertical resilient wall passes thereby.

In operation, pigment and particulate laden air is passed through a spray chamber 54 (FIG. 2) wherein water or another suitable vehicles is sprayed into the laden air to precipitate the particulates such as pigment into the water. The pigment and water or vehicle are collected by a trough 56 deployed at the bottom of the spray chamber 54. A conduit 58 passes the pigment and water mixture to the reservoir 14 where the pigment is allowed to float to the top of the liquid to form a cake. A downward extending lower portion 60 of the inclined wall 28 and a baffle 62 serve to separate the cake containing liquid or vehicle 12 from a pure vehicle portion 64 of the reservoir. A pump 66 draws vehicle from the pure vehicle portion 64 of the reservoir through a first conduit 68 and passes the vehicle under pressure to a second conduit and then to a plurality of nozzles 72 where the vehicle is atomized and sprayed into the spray chamber 54 to separate pigment from the pigment containing air.

A drive means 74 (FIG. 1) is provided for driving the continuous conveyor belt 18. The drive means 74 comprises an electric motor 76 which drives the input of a gear reducer 78 and an output of the gear reducer rotatably drives a first pulley 80. The first pulley 80 is rotatably and drivingly connected to a second pulley 82 by a belt 84 and the second pulley 82 rotatably drives the drum 24 which drives the continuous belt 18.

It can thus be seen that the present invention has provided a new and improved system for separating pigment from a vehicle such as water wherein the paint skimming apparatus disclosed may be used in conjunction with a spray chamber. The skimmer in conjunction with the spray chamber purifies pigment laden air utilizing a vehicle sprayed into the pigment laden air in the spray chamber.

It should be understood by those skilled in the art to which this invention pertains, that other forms of the Applicant's invention may be had, all coming within the spirit of the invention and the scope of the appended claims.

Having thus described my invention what I claim is:

1. An apparatus for separating pigment containing cake from a vehicle comprising:
   a reservoir for holding the cake containing vehicle;
   a continuous conveyor belt supported within the reservoir inclined upward from a surface of the cake containing vehicle;
   at least one outward extending wall attached the belt including a pair of opposed ends and an outer edge, said outward extending wall engaging the cake containing vehicle at a lower end of the belt;
   an inclined wall supported within the reservoir disposed parallel to and spaced below the belt slidingly engaging the outer edge;
   a discharge opening formed at an upper end of the inclined wall;
   a pair of opposed vertical walls affixed the inclined wall;
   a pair of opposed vertical resilient walls attached the opposed ends slidingly engaging the opposed vertical walls; and
   wherein cake is collected from the vehicle at a lower end of the belt and moved along the inclined wall by the outward extending wall and discharged through the discharge opening.

2. The apparatus as defined in claim 1 further comprising:
   an upper portion of the inclined wall deployed above the cake containing vehicle; and
   a plurality of apertures formed in the portion of the inclined wall deployed above the vehicle for draining vehicle back to the reservoir.

3. The apparatus as defined in claim 2 further comprising a resilient wall attached the outer edge slidingly engaging the inclined wall; and
   the resilient wall projecting into the apertures to provide a wiping and cleaning of the apertures as the resilient wall moves therepast.

4. The apparatus as defined in claim 1 further comprising:
   a pair of opposed vertical walls affixed the inclined wall slidingly abutting the opposed ends.

5. The apparatus as defined in claim 4 further comprising a pair of vertical resilient walls attached the opposed ends slidingly engaging the opposed vertical walls.

6. The apparatus as defined in claim 1 further comprising a means for driving the conveyor belt.

7. An apparatus for separating cake from liquid comprising:
   a reservoir for holding the cake containing liquid;
   a continuous conveyor belt supported by the reservoir including an outward extending wall attached the belt, said wall engaging and conveying the cake to a container;
   a reservoir supported vertical wall spaced from the outward extending wall;

a resilient wall attached the outward extending wall and abutting the vertical wall for movement therealong;

a reservoir supported baffle to separate cake containing liquid from liquid;
means for passing liquid from the reservoir; and
means for passing cake containing liquid into the reservoir.

* * * * *